US012175447B2

(12) United States Patent
Ji et al.

(10) Patent No.: US 12,175,447 B2
(45) Date of Patent: *Dec. 24, 2024

(54) SECURE GENERATION OF ONE-TIME PASSCODES USING A CONTACTLESS CARD

(71) Applicant: Capital One Services, LLC, McLean, VA (US)

(72) Inventors: Jason Ji, Reston, VA (US); Jeffrey Rule, Chevy Chase, MD (US); Colin Hart, Arlington, VA (US); Wayne Lutz, Fort Washington, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,237

(22) Filed: Aug. 17, 2023

(65) Prior Publication Data

US 2023/0394462 A1    Dec. 7, 2023

Related U.S. Application Data

(63) Continuation of application No. 17/531,981, filed on Nov. 22, 2021, now Pat. No. 11,763,287, which is a
(Continued)

(51) Int. Cl.
*G06Q 20/32* (2012.01)
*G06Q 20/38* (2012.01)
(Continued)

(52) U.S. Cl.
CPC ..... *G06Q 20/3226* (2013.01); *G06Q 20/3278* (2013.01); *G06Q 20/38215* (2013.01);
(Continued)

(58) Field of Classification Search
CPC ........... G06Q 20/3226; G06Q 20/3278; G06Q 20/38215; G06Q 20/386; G06Q 20/401;
(Continued)

(56) References Cited

U.S. PATENT DOCUMENTS

2013/0211929 A1*  8/2013  Itwaru ................. G06Q 20/325
                                                       705/16
2016/0307190 A1* 10/2016  Zarakas ............... G06Q 20/321
(Continued)

OTHER PUBLICATIONS

Berg "Fundamentals of EMV", Smart Card Alliance, Feb. 26, 2013, 37 pages (Year: 2013).*

*Primary Examiner* — James D Nigh
(74) *Attorney, Agent, or Firm* — KDW FIRM PLLC

(57) ABSTRACT

Systems, methods, apparatuses, and computer-readable media for secure generation of one-time passcodes using a contactless card. In one example, an operating system (OS) of a device may receive a uniform resource locator (URL) and a cryptogram from a contactless card. The OS may launch an application associated with the URL. The application may transmit the cryptogram to an authentication server. The application may receive a decryption result from the authentication server indicating the authentication server decrypted the cryptogram. Based on the decryption result, the application may request an OTP. The processor may receive an OTP from an OTP generator. The application may receive an input value and compare the input value to a copy of the OTP. The application may determine that the comparison results in a match, and display, based on the determination that the comparison results in the match, one or more attributes of the account.

20 Claims, 13 Drawing Sheets

Related U.S. Application Data continuation of application No. 17/140,698, filed on Jan. 4, 2021, now Pat. No. 11,216,799.

(51) Int. Cl.
  *G06Q 20/40* (2012.01)
  *H04L 9/40* (2022.01)
  *G06Q 20/34* (2012.01)
  *H04L 67/02* (2022.01)
  *H04W 4/80* (2018.01)

(52) U.S. Cl.
  CPC ......... *G06Q 20/386* (2020.05); *G06Q 20/401* (2013.01); *H04L 63/0838* (2013.01)

(58) Field of Classification Search
  CPC ............ G06Q 20/108; G06Q 20/3221; G06Q 20/326; G06Q 20/352; G06Q 20/353; G06Q 20/3825; G06Q 20/385; G06Q 20/4012; G06Q 20/409; H04L 63/0838; H04L 67/02; H04W 4/80
  USPC ......................................................... 705/75
  See application file for complete search history.

(56) References Cited

U.S. PATENT DOCUMENTS

| | | | | |
|---|---|---|---|---|
| 2018/0005227 A1* | 1/2018 | Sandeløv | ............... | G06Q 20/20 |
| 2019/0347888 A1* | 11/2019 | Agbeyo | ............... | G07D 7/0043 |
| 2023/0062507 A1* | 3/2023 | Aabye | .................. | H04L 9/3271 |

* cited by examiner

SECURE GENERATION OF ONE-TIME PASSCODES USING A CONTACTLESS CARD

RELATED APPLICATIONS

This application is a continuation of U.S. patent application Ser. No. 17/531,981, filed Nov. 22, 2021, which is a continuation of U.S. patent application Ser. No. 17/140,698, titled "SECURE GENERATION OF ONE-TIME PASSCODES USING A CONTACTLESS CARD" filed on Jan. 4, 2021. The contents of the aforementioned application are incorporated herein by reference in their entirety.

TECHNICAL FIELD

Embodiments disclosed herein are related to computing systems. More specifically, embodiments disclosed herein are related to computing systems that provide for secure generation of one-time passcodes using a contactless card.

BACKGROUND

One-time passcodes may be used as a second form of authentication. However, one-time passcodes are susceptible to many security risks. For example, if a user leaves their smartphone unlocked in a public place, passersby may have access to any passcodes sent to the device. Similarly, if a malicious user gains access to the device and/or the account where the passcodes are sent, the malicious user may have access to the passcodes. Doing so may allow the malicious user to access account data and other sensitive information.

SUMMARY

Systems, methods, apparatuses, and computer-readable media for secure generation of one-time passcodes using a contactless card. In one example, an operating system (OS) executing on a processor of a device may receive a uniform resource locator (URL) and a cryptogram from a contactless card associated with an account. The OS may launch an application associated with the contactless card. The application may transmit the cryptogram to an authentication server. The application may receive a decryption result from the authentication server indicating the authentication server decrypted the cryptogram. Based on the decryption result, the application may transmit a request for a one-time passcode (OTP) comprising an identifier to the URL. The processor may receive an OTP from an OTP generator at the URL. The application may receive an input value and compare the input value to a copy of the OTP received from the OTP generator. The application may determine that the comparison results in a match, and display, based on the determination that the comparison results in the match, one or more attributes of the account on the device.

DETAILED DESCRIPTION

Figure 1A:
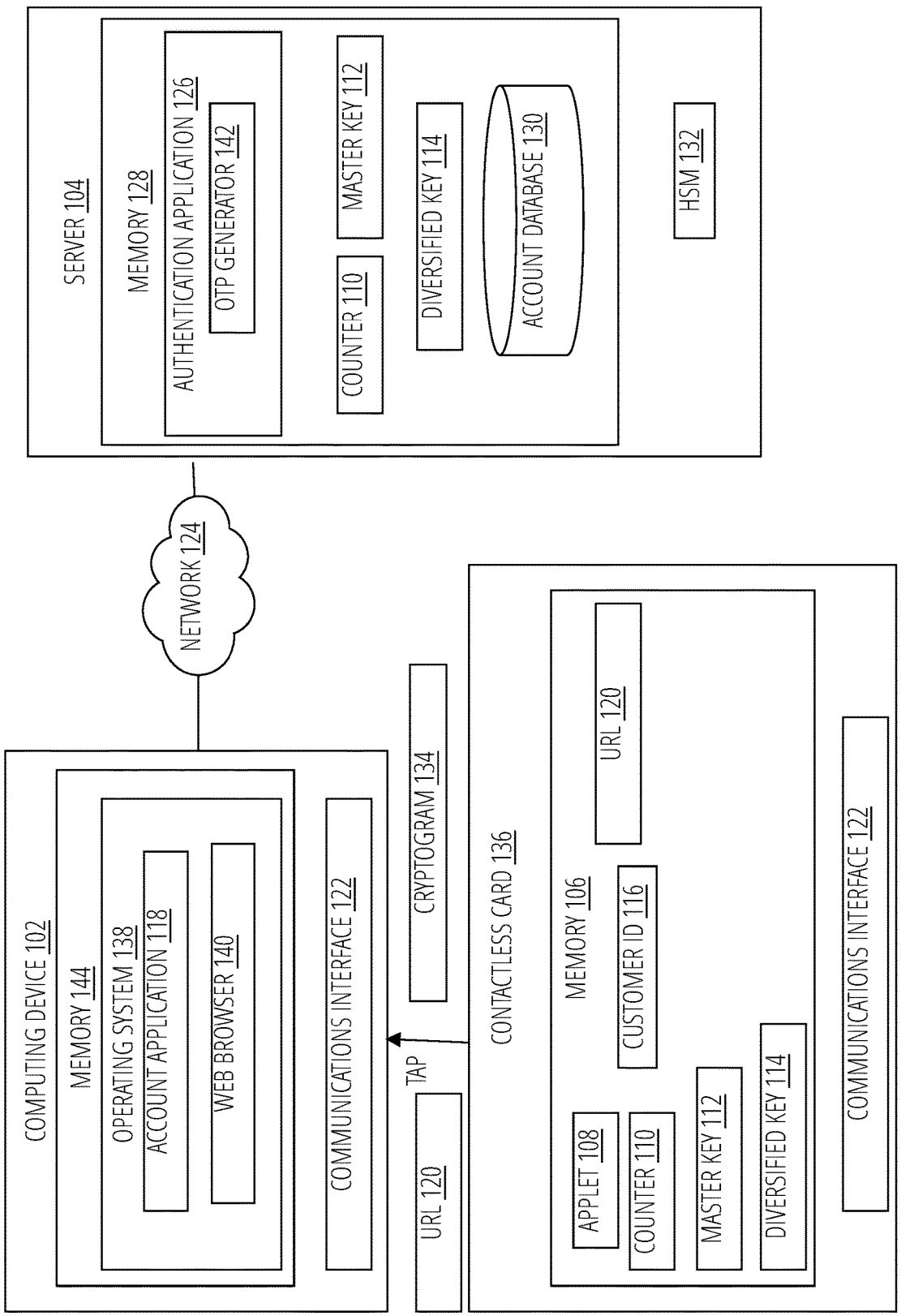
FIG. 1A illustrates an aspect of the subject matter in accordance with one embodiment.

Embodiments disclosed herein provide techniques to securely generate a one-time passcode (OTP) that may be used as a second form of authentication. Generally, a user may desire to authenticate into an account, complete a purchase, or perform any operation that requires multi-factor authentication (MFA). In one example, the user may tap a contactless card to a computing device to initiate the authentication. In response to coming into communications range with the device, the contactless card may generate a data package comprising a cryptogram and a uniform resource locator (URL). An operating system of the device may read the data package and/or the URL and launch an account application on the device that is associated with the URL. In one example, the account application is associated with an issuer of the contactless card. The account application may transmit an OTP request to an OTP generator at the URL. The OTP request may include the cryptogram.

The OTP generator and/or a server associated with the OTP generator may then attempt to decrypt the cryptogram as described in greater detail herein. If the decryption is successful, the OTP generator may identify contact information for the associated account, such as a phone number, email, etc. The OTP generator may generate an OTP and transmit the OTP to the identified contact information. The user may then receive the OTP from the OTP generator and provide the received OTP as input to the account application. The account application may compare the input to an instance of the OTP received from the OTP generator. If the comparison results in a match, the account application may validate the OTP, and permit the requested operation, e.g., viewing account details, making a purchase, etc. If the comparison does not result in a match, the verification may fail, and the account application may reject or otherwise restrict performance of the requested operation.

Advantageously, embodiments disclosed herein provide secure techniques for generating an OTP for multi-factor authentication using a contactless card. By leveraging cryptograms generated by contactless cards, embodiments of the disclosure may securely verify the identity of the user requesting to perform an operation with minimal risk of fraudulent activity. Furthermore, doing so ensures that OTP codes are only generated when the user has access to a contactless card as well as a computing device with a secure application for facilitating the cryptogram verification with the server. Furthermore, by providing a simplified OTP generation process, more requests may be handled by the server, thereby improving system performance.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts an exemplary computing architecture 100, also referred to as a system, consistent with disclosed embodiments. Although the computing architecture 100 shown in FIGS. 1A-1C has a limited number of elements in a certain topology, it may be appreciated that the computing architecture 100 may include more or less elements in alternate topologies as desired for a given implementation.

The computing architecture 100 comprises a computing device 102, a server 104, and a contactless card 136. The contactless card 136 is representative of any type of payment card, such as a credit card, debit card, ATM card, gift card, and the like. The contactless card 136 may comprise one or more communications interfaces 122, such as a radio frequency identification (RFID) chip, configured to communicate with a communications interface 122 (also referred to herein as a "card reader", a "wireless card reader", and/or a "wireless communications interface") of the computing devices 102 via NFC, the EMV standard, or other short-range protocols in wireless communication. Although NFC is used as an example communications protocol herein, the disclosure is equally applicable to other types of wireless communications, such as the EMV standard, Bluetooth, and/or Wi-Fi.

The computing device 102 is representative of any number and type of computing device, such as smartphones, tablet computers, wearable devices, laptops, portable gaming devices, virtualized computing system, merchant terminals, point-of-sale systems, servers, desktop computers, and the like. A mobile device is used as an example of the computing device 102, but should not be considered limiting of the disclosure. The server 104 is representative of any type of computing device, such as a server, workstation, compute cluster, cloud computing platform, virtualized computing system, and the like. Although not depicted for the sake of clarity, the computing device 102, contactless card 136, and server 104 each include one or more processor circuits to execute programs, code, and/or instructions.

As shown, a memory 106 of the contactless card 136 includes an applet 108, a counter 110, a master key 112, a diversified key 114, and a unique customer identifier (ID) 116. The applet 108 is executable code configured to perform the operations described herein. The counter 110, master key 112, diversified key 114, and customer ID 116 are used to provide security in the system 100 as described in greater detail below.

As shown, a memory 144 of the mobile device 102 includes an instance of an operating system (OS) 138. Example operating systems 138 include the Android® OS, iOS®, macOS®, Linux®, and Windows® operating systems. As shown, the OS 138 includes an account application 118 and a web browser 140. The account application 118 allows users to perform various account-related operations, such as activating payment cards, viewing account balances, purchasing items, processing payments, and the like. In some embodiments, a user may authenticate using authentication credentials to access certain features of the account application 118. For example, the authentication credentials may include a username (or login) and password, biometric credentials (e.g., fingerprints, Face ID, etc.), and the like. The web browser 140 is an application that allows the device 102 to access information via the network 124 (e.g., via the Internet).

As shown, a memory 128 of the server 104 includes an authentication application 123, which includes an OTP generator 142. Although depicted as integrated components of the server 104, in some embodiments, the authentication application 123 and the OTP generator 142 may be separated into distinct components. Furthermore, the authentication application 123 and/or the OTP generator 142 may be implemented in hardware, software, and/or a combination of hardware and software.

In some embodiments, to secure the account application 118 and/or associated data, e.g., details of the user's account in the account database 130, the system 100 may provide for secure generation of OTPs using the contactless card 136. For example, a user may provide authentication credentials to the account application 118, such as a username/password that are validated by the account application 118 (e.g., using a local instance of the account database 130 and/or transmitting the credentials to the server 104 for validation). Once validated, the account application 118 may instruct the user to tap the contactless card 136 to the computing device 102.

In the embodiment depicted in FIG. 1A, the user may tap the contactless card 136 to the computing device 102 (or otherwise bring the contactless card 136 within communications range of the card reader 122 of the device 102). The applet 108 of the contactless card 136 may then generate a URL 120 that is directed to a resource, such as the server 104, the authentication application 126, and/or the OTP generator 142. In some embodiments, the applet 108 constructs the URL 120 according to one or more rules. In some embodiments, the contactless card 136 stores a plurality of URLs 120 and the applet 108 selects the URL 120 from the plurality of URLs 120 based on one or more rules. In some embodiments, the applet 108 may generate the URL 120 by selecting a URLs 120 and adding dynamic data, such as a cryptogram 134, as one or more parameters of the URL.

The cryptogram 134 may be based on the customer ID 116 of the contactless card 136. The cryptogram 134 may be generated based on any suitable cryptographic technique. In some embodiments, the applet 108 may include the URL 120, the cryptogram 134, and an unencrypted identifier (e.g., the customer ID 116, an identifier of the contactless card 136, and/or any other unique identifier) as part of a data package. In at least one embodiment, the data package is an NDEF file.

As stated, the computing architecture 100 is configured to implement key diversification to secure data, which may be referred to as a key diversification technique herein. Generally, the server 104 (or another computing device) and the contactless card 136 may be provisioned with the same master key 112 (also referred to as a master symmetric key). More specifically, each contactless card 136 is programmed with a distinct master key 112 that has a corresponding pair in the server 104. For example, when a contactless card 136 is manufactured, a unique master key 112 may be programmed into the memory 106 of the contactless card 136. Similarly, the unique master key 112 may be stored in a record of a customer associated with the contactless card 136 in the account database 130 of the server 104 (and/or stored in a different secure location, such as the hardware security module (HSM) 132). The master key 112 may be kept secret from all parties other than the contactless card 136 and server 104, thereby enhancing security of the system 100. In some embodiments, the applet 108 of the contactless card 136 may encrypt and/or decrypt data (e.g., the customer ID 116) using the master key 112 and the data as input a cryptographic algorithm. For example, encrypting the customer ID 116 with the master key 112 may result in the cryptogram 134. Similarly, the server 104 may encrypt and/or decrypt data associated with the contactless card 136 using the corresponding master key 112.

In other embodiments, the master keys 112 of the contactless card 136 and server 104 may be used in conjunction with the counters 110 to enhance security using key diversification. The counters 110 comprise values that are synchronized between the contactless card 136 and server 104. The counter 110 may comprise a number that changes each time data is exchanged between the contactless card 136 and the server 104 (and/or the contactless card 136 and the computing device 102). When preparing to send data (e.g., to the server 104 and/or the device 102), the applet 108 of the contactless card 136 may increment the counter 110. The applet 108 of the contactless card 136 may then provide the master key 112 and counter 110 as input to a cryptographic algorithm, which produces a diversified key 114 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES 107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the applet 108 may then encrypt the data (e.g., the customer ID 116 and/or any other data) using the diversified key 114 and the data as input to the cryptographic algorithm. For example, encrypting the customer ID 116 with the diversified key 114 may result in an encrypted customer ID (e.g., a cryptogram 134). In some embodiments, the cryptogram 134 is included in as a parameter of the URL 120. In other embodiments, the cryptogram 134 is not a parameter of the URL 120, but is transmitted with the URL 120 in a data package such as an NDEF file. The operating system 138 may then read the data package including the URL 120 and cryptogram 134 via the communications interface 122 of the computing device 102.

As stated, the cryptogram 134 may be a parameter of the URL 120. For example, the URL 120 may be "http://www.example.com/OTPgenerator?param=ABC123". In such an example, the cryptogram 134 may correspond to the parameter "ABC123". However, if the cryptogram 134 is not a parameter of the URL 120, the URL 120 may be "http://www.exmaple.com/OTPgenerator." Regardless of whether the URL 120 includes the cryptogram 134 as a parameter, the URL 120 may be registered with the account application 118, which causes the operating system 138 to launch the account application 118, and provide the URL 120 and cryptogram 134 to the account application 118 as input.

The account application 118 may then transmit the cryptogram 134 to the server 104 with a request to generate an OTP. In embodiments where the URL 120 includes the cryptogram 134 as a parameter, the account application 118 extracts the cryptogram 134 from the URL 120 and transmits the request with cryptogram 134 to an address associated with the OTP generator 142, e.g., at least a portion of the URL 120. In some embodiments, the 118 makes an application programming interface (API) call to the OTP generator 142. Further still, the account application 118 may include another identifier, such as the unencrypted customer ID 116 provided by the applet 108 in the data package. In some embodiments, the another identifier may be an identifier of the contactless card 136, an account identifier, and the like. In such embodiments, the account application 118 may include an instance of one or more portions of the account database 130 to determine the another identifier.

Figure 1B:
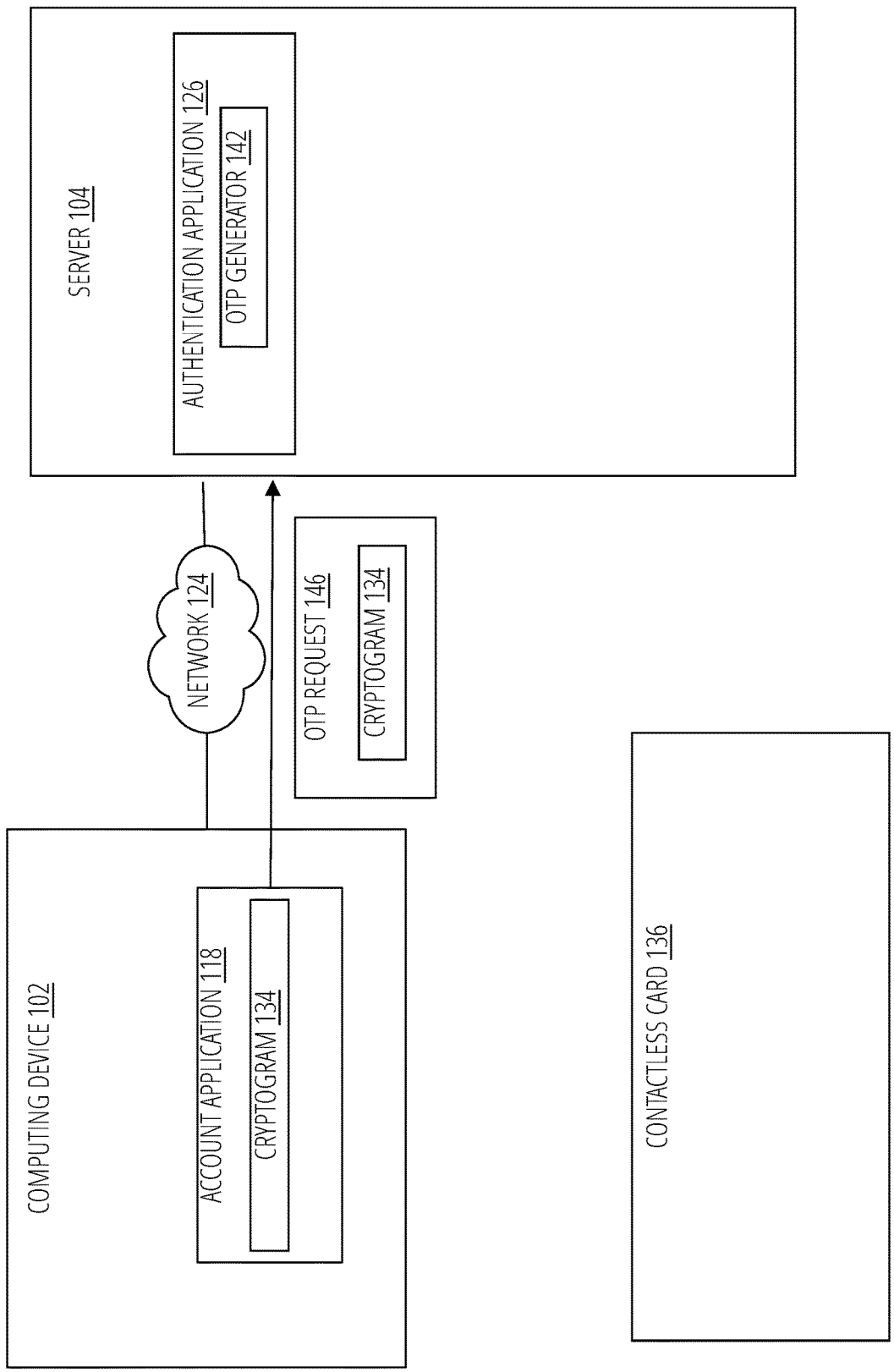
FIG. 1B illustrates an aspect of the subject matter in accordance with one embodiment.

FIG. 1B depicts an embodiment where the account application 118 transmits an OTP request 146 comprising the cryptogram 134 and the unencrypted identifier to the server 104. Once received, the server 104 may attempt to authenticate the cryptogram 134. For example, the authentication application 126 may attempt to decrypt the cryptogram 134 using a copy of the master key 112 stored by the server 104. In some embodiments, the authentication application 126 may identify the master key 112 and counter 110 using the unencrypted customer ID 116 (or other identifier) provided by the account application 118 to the server 104. In some examples, the authentication application 126 may provide the master key 112 and counter 110 as input to the cryptographic algorithm, which produces a diversified key 114 as output. The resulting diversified key 114 may correspond to the diversified key 114 of the contactless card 136, which may be used to decrypt the cryptogram 134.

Regardless of the decryption technique used, the authentication application 126 may successfully decrypt the cryptogram 134, thereby verifying or authenticating the cryptogram 134 in the OTP request 146 (e.g., by comparing the customer ID 116 that is produced by decrypting the cryptogram 134 to a known customer ID stored in the account database 130, and/or based on an indication that the decryption using the master key 112 and/or diversified key 114 was successful). Although the keys 112, 114 are depicted as being stored in the memory 128, the keys may be stored elsewhere, such as in a secure element and/or the HSM 132. In such embodiments, the secure element and/or the HSM 132 may decrypt the cryptogram 134 using the master key 112 and/or diversified key 114 and a cryptographic function. Similarly, the secure element and/or HSM 132 may generate the diversified key 114 based on the master key 112 and counter 110 as described above. If the decryption is successful, the authentication application 126 may identify contact information for the user, e.g., an email address, phone number, a device identifier registered to the instance of the account application 118, a device identifier of the computing device 102, etc., stored in the account database 130. The authentication application 126 may identify the contact information based on the unencrypted identifier included in the OTP request 146. The authentication application 126 may then instruct the OTP generator 142 to generate an OTP and transmit the OTP to the identified contact information.

If, however, the authentication application 126 is unable to decrypt the cryptogram 134 to yield the expected result (e.g., the customer ID 116 of the account associated with the contactless card 136), the authentication application 126 does not validate the cryptogram 134. In such an example, the authentication application 126 determines to refrain from generating an OTP. The authentication application 126 may transmit an indication of the failed decryption to the account application 118.

Figure 1C:
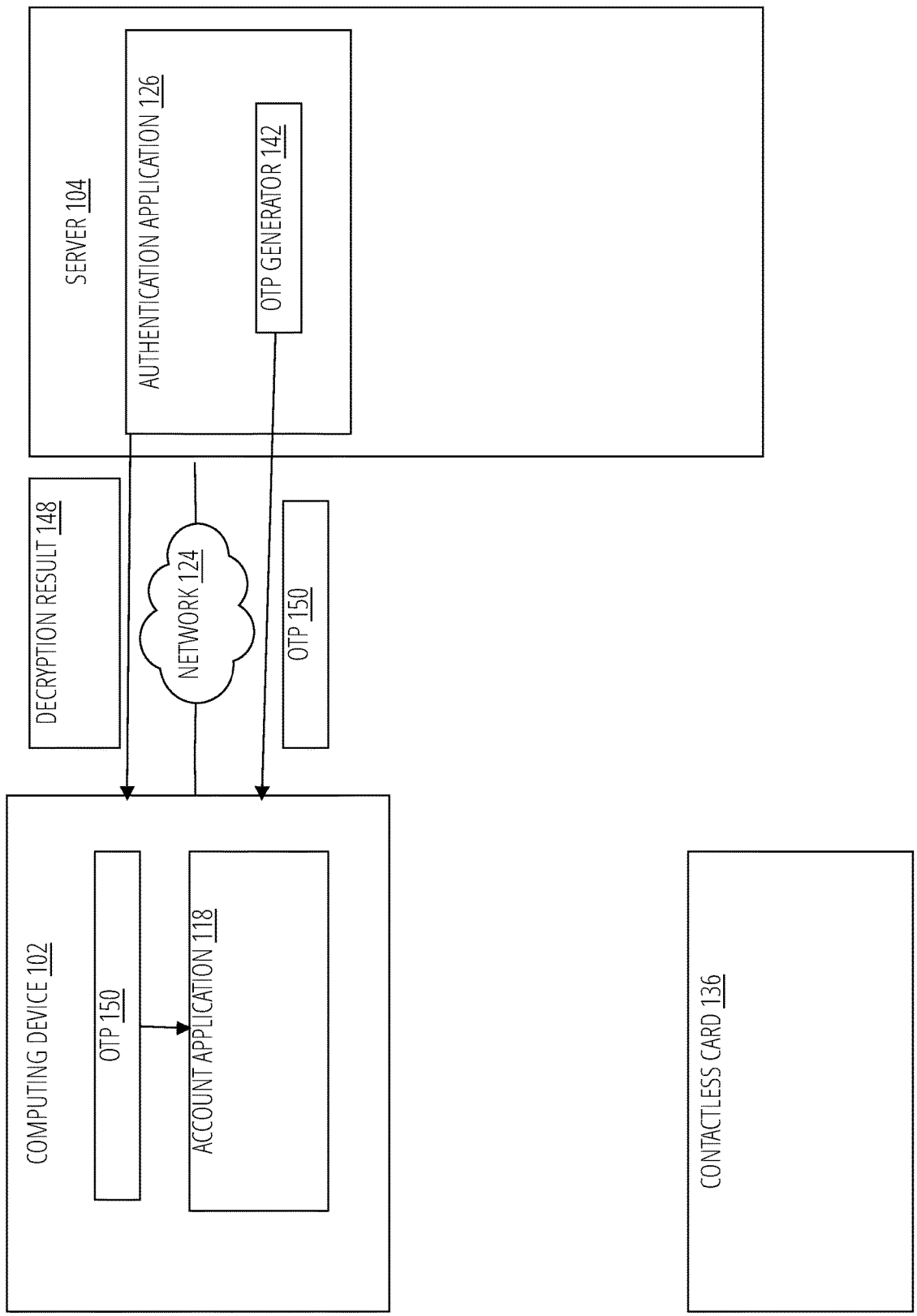
FIG. 1C illustrates an aspect of the subject matter in accordance with one embodiment.

FIG. 1C depicts an embodiment where the authentication application 126 transmits a decryption result 148 to the account application 118. The decryption result 148 generally indicates whether the server 104 decrypted the cryptogram 134 or did not decrypt the cryptogram 134. In the example depicted in FIG. 1C, the decryption result 148 indicates that the server 104 decrypted the cryptogram 134. The account application 118 may use the decryption result 148 to determine whether the cryptogram 134 was decrypted. Based on the successful decryption, the OTP generator 142 may generate and transmit an OTP 150 to the computing device 102 based on the determined contact information. The OTP 150 may be any alphanumeric string of any length. If the contact information is a phone number, the OTP generator 142 may transmit the OTP 150 via a short message service (SMS) message. If the contact information is an email address, the OTP generator 142 may transmit the OTP 150 via email. If the contact information is a device identifier, the OTP generator 142 may transmit the OTP 150 as part of a push notification directed to the computing device 102.

The user may then provide the received OTP as input to the account application 118 via a user interface. The account application 118 may then compare the input provided by the user to an instance of the OTP 150 received from the OTP generator 142. In another embodiment, the account application 118 may transmit the user input to the OTP generator 142, which performs the comparison. If the OTP generator 142 performs the comparison, the OTP generator 142 transmits a comparison result to the account application 118. In some embodiments, the user may provide the input to another application, such as the web browser 140 that has loaded a page associated with the OTP generator 142. The web page may then perform the comparison. If the comparison results in a match, the multi-factor authentication may be completed, and the user may be able to perform one or more requested operations. For example, the user may view account attributes, perform an operation associated with the account, make a payment, transfer funds, view balances, etc.

Figure 2A:
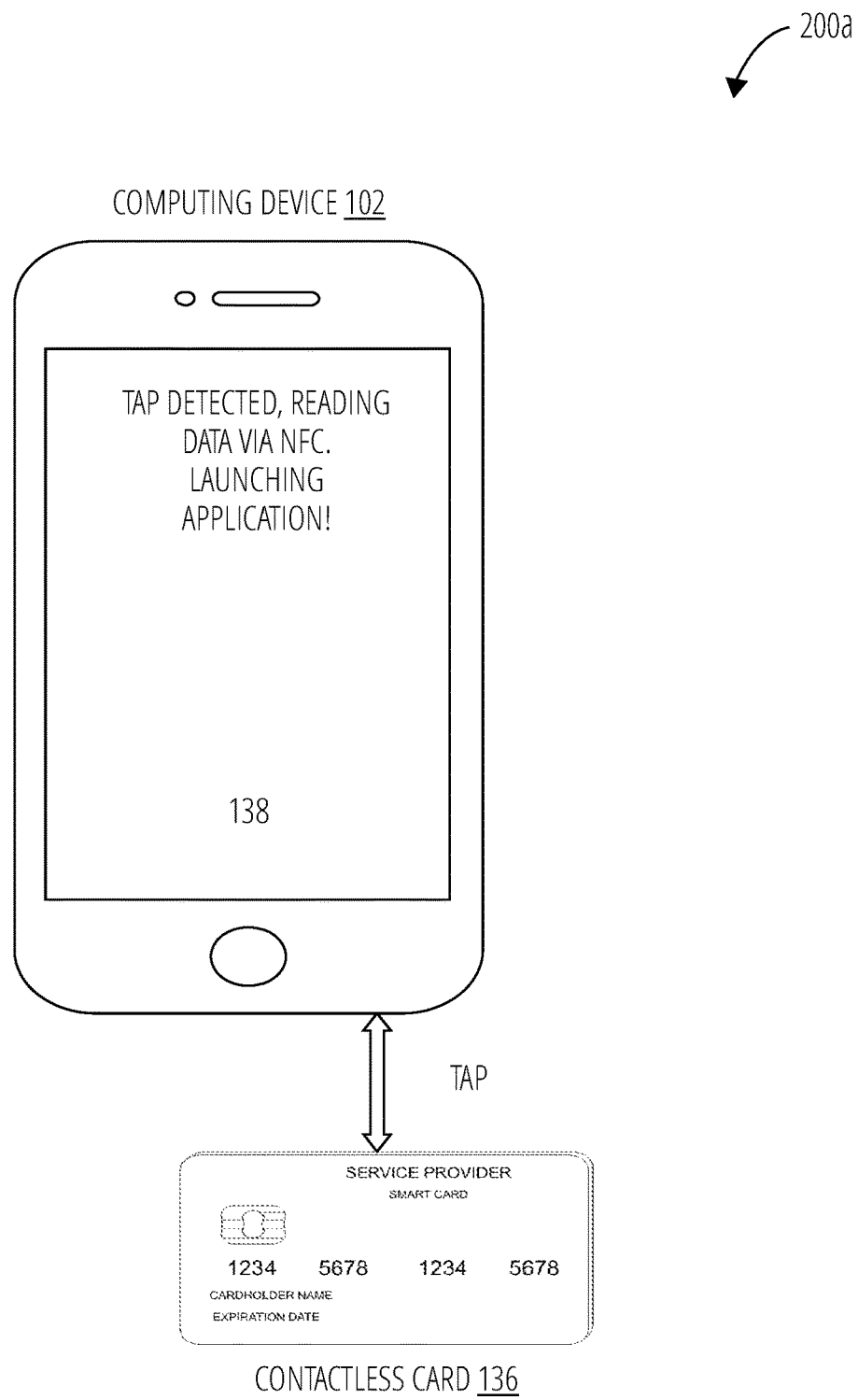
FIG. 2A illustrates an aspect of the subject matter in accordance with one embodiment.

FIG. 2A is a schematic 200a illustrating an embodiment where a contactless card 136 is tapped to a computing device 102. While the computing device 102 is depicted as outputting a screen (e.g., a home screen) of the operating system 138, the computing device 102 may generally be in any state. For example, the user may be using another application, such as the web browser 140, when tapping the contactless card 136 to the computing device 102.

As stated, when the contactless card 136 is tapped to the computing device 102, the applet 108 may generate a cryptogram 134 and URL 120. In some embodiments, the cryptogram 134 is a parameter of the URL 120. The applet 108 may further include an identifier, such as an unencrypted customer ID 116, an identifier of the contactless card 136, and the like. If the cryptogram 134 is a parameter of the URL 120, the unencrypted identifier may also be a parameter of the URL 120. Regardless of whether the cryptogram 134 and/or unencrypted identifier are parameters of the URL 120, the cryptogram 134, unencrypted identifier, and the URL 120 may be included in a data package, such as an NDEF file, that is read by the computing device 102. As shown, responsive to receiving the data package, the operating system 138 may launch the account application 118, as the URL 120 (or a portion thereof) may be registered with the account application 118 in the operating system 138.

Figure 2B:
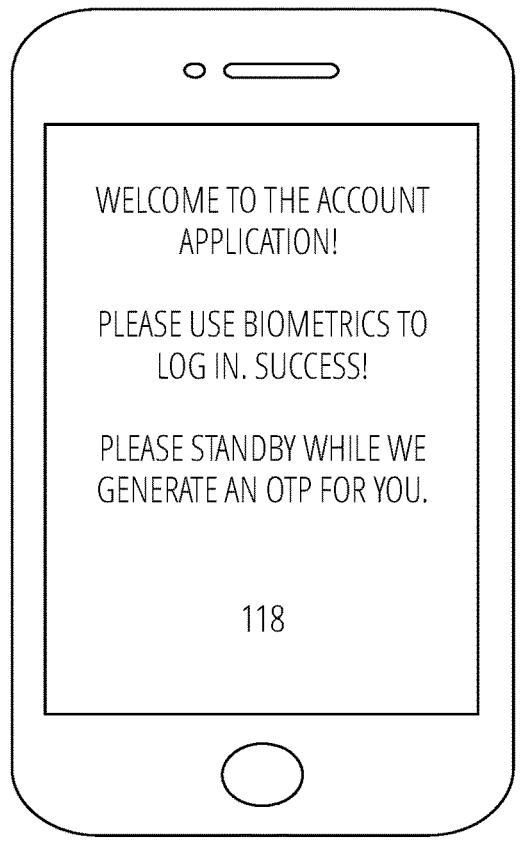
FIG. 2B illustrates an aspect of the subject matter in accordance with one embodiment.

FIG. 2B is a schematic 200b illustrating an embodiment where the account application 118 is opened responsive to the operating system 138 reading the URL 120 received from the contactless card 136. As shown, the account application 118 instructs the user to provide a first authentication factor, which may be biometric credentials. The account application 118 may verify the biometric credentials, and based on the verification, generate an OTP request 146 for an OTP 150 from the OTP generator 142. As stated, the account application 118 may transmit the cryptogram 134 and an unencrypted identifier to the OTP generator 142. In some embodiments, the OTP request 146 may be an API call.

The authentication application 126 may then attempt to decrypt the cryptogram 134 as described in greater detail above. If the decryption is successful, the authentication application 126 may identify contact information for the user's account in the account database 130. In some embodiments, the contact information is identified based on the unencrypted identifier, e.g., the unencrypted customer ID 116, a device ID, and the like. The authentication application 126 may then instruct the OTP generator 142 to generate an OTP 150 and transmit the OTP 150 to the contact information. The authentication application 126 may also transmit a decryption result 148 to the account application 118.

Figure 2C:
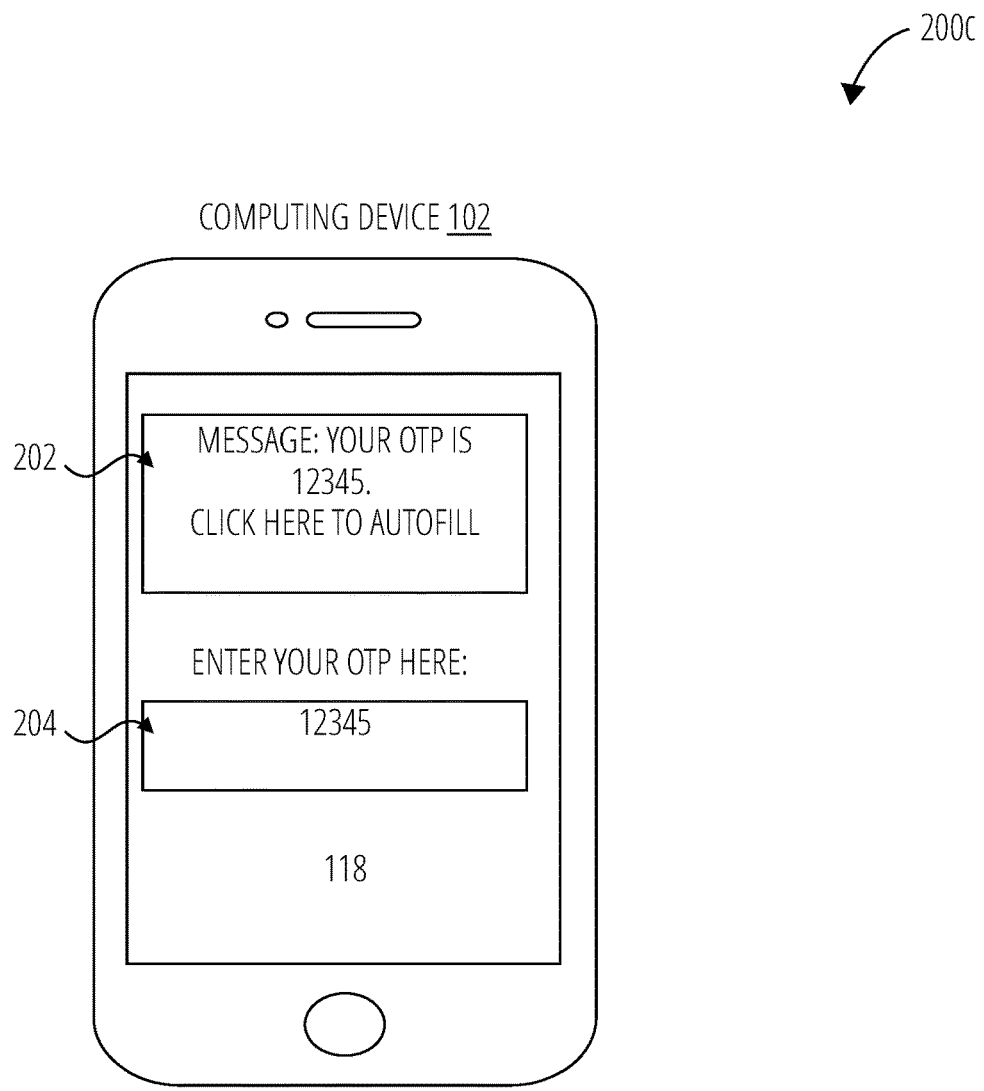
FIG. 2C illustrates an aspect of the subject matter in accordance with one embodiment.

FIG. 2C is a schematic 200c illustrating an embodiment where the OTP 150 is sent to the computing device 102 as a push notification 202. The user may be instructed to enter the OTP 150 in the input field 204. As shown, the push notification 202 allows the user to select the push notification 202 to autofill the OTP 150 to the field 204. For example, when selected, an autofill service (not pictured) of the operating system 138 may copy the OTP 150 and fill the OTP 150 into the field 204. In another example, the OTP 150 may be copied to a clipboard (not pictured) of the operating system 138. Doing so allows the user to paste the OTP 150 from the clipboard to the field 204.

As shown, the OTP 150 may be entered as input to field 204. The account application 118 may then verify the OTP 150 entered into field 204, e.g., by comparing the input to an instance of the OTP 150 received from the OTP generator 142. In another example, the account application 118 provides the input entered into field 204 to the OTP generator 142, which performs the comparison, and returns a result of the comparison to the account application 118. If the comparison results in a match, the account application 118 may determine the multi-factor authentication is complete.

Figure 2D:
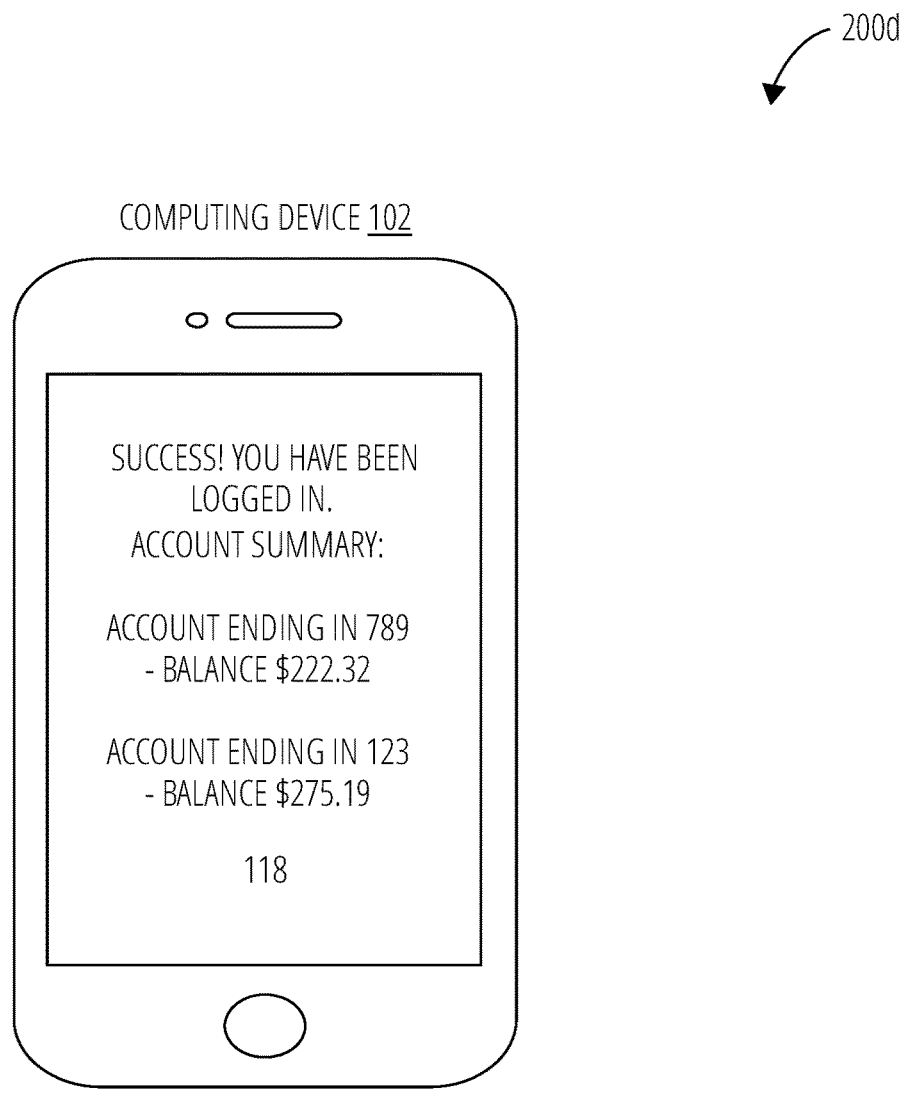
FIG. 2D illustrates an aspect of the subject matter in accordance with one embodiment.

FIG. 2D is a schematic 200d illustrating an embodiment where the input provided in field 204 matches the OTP 150. Based on the match and the decryption of the cryptogram 134, the user may be logged into their account in the account application 118. As shown, the account application 118 displays various account attributes, e.g., account balances. Embodiments are not limited in this context, as the MFA using the OTP 150 may be used to authorize any requested operation.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 3:
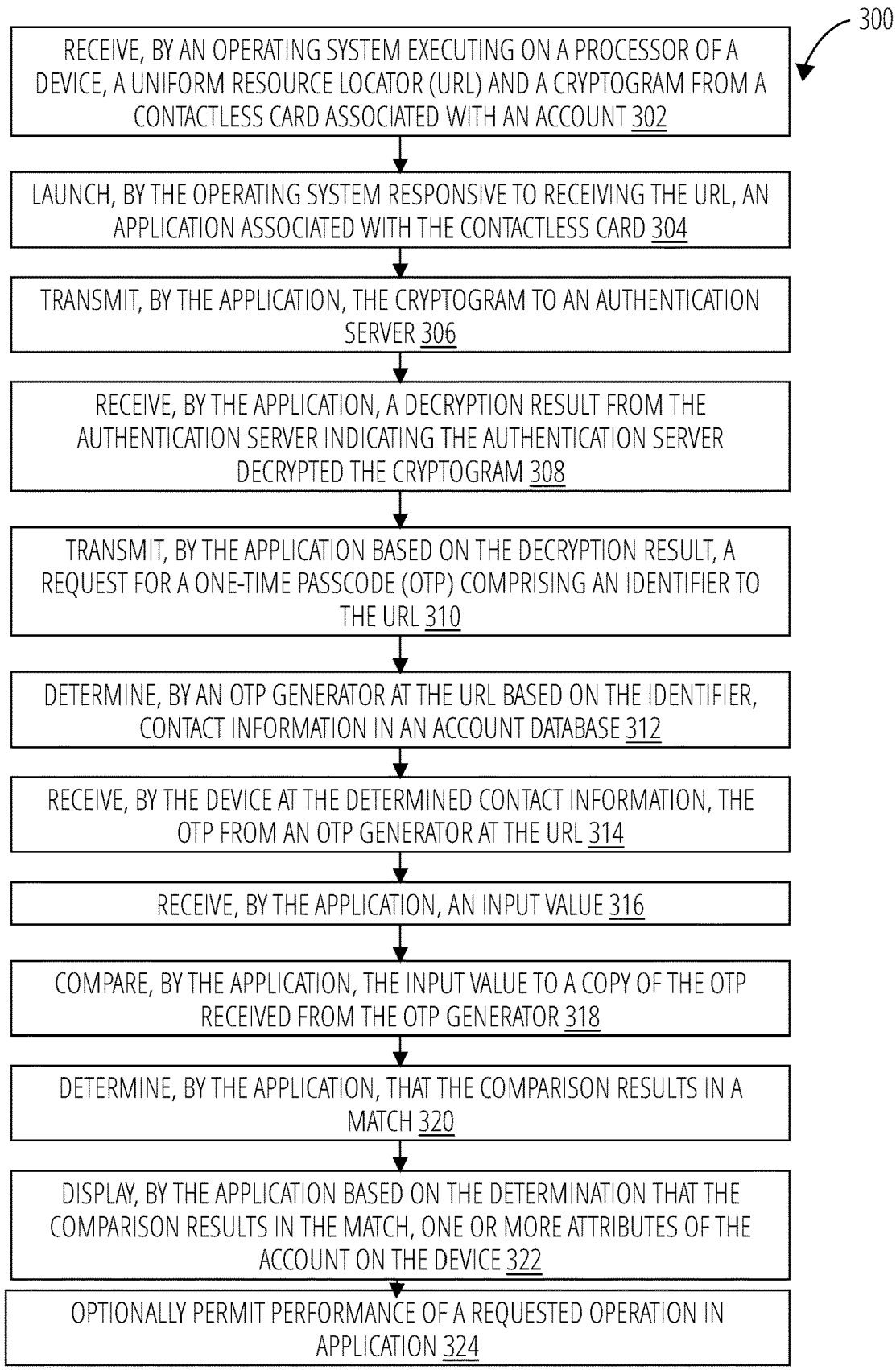
FIG. 3 illustrates a routine 300 in accordance with one embodiment.

FIG. 3 illustrates an embodiment of a logic flow, or routine, 300. The logic flow 300 may be representative of some or all of the operations executed by one or more embodiments described herein. For example, the logic flow 300 may include some or all of the operations to enable secure generation of an OTP using a contactless card. Embodiments are not limited in this context.

In block 302, routine 300 receives, by an operating system 138 executing on a processor of a computing device 102, a uniform resource locator (URL) 120 and a cryptogram 134 from a contactless card 136 associated with an account. In block 304, routine 300 launches, by the operating system 138 responsive to receiving the URL 120, the account application 118 associated with the contactless card 136. In some embodiments, however, the account application 118 is executing in the foreground of the operating system 138 and need not be launched. In such embodiments, the user may request to perform an operation, such as viewing an account balance, transferring funds, etc.

In block 306, routine 300 transmits, by the account application 118, the cryptogram 134 to an authentication server 104. The account application 118 may further include an unencrypted identifier, e.g., the customer ID 116 and/or a device identifier to the authentication application 126. In block 308, routine 300 receives, by the account application 118, a decryption result 148 from the server 104 indicating the authentication server 104 decrypted the cryptogram 134.

In block 310, routine 300 transmits, by the account application 118 based on the decryption result, a request for a one-time passcode (OTP) comprising an identifier to the server 104. The identifier may be the unencrypted customer ID 116, the device identifier, and/or an identifier of the contactless card 136. In block 312, routine 300 determines, by the server 104 based on the identifier, contact information in an account database 130. The contact information may include, but is not limited to, a phone number, email address, device identifier, etc. In block 314, routine 300 receives, by the computing device 102 at the determined contact information, the OTP 150 from the OTP generator 142. In block 316, routine 300 receives, by the account application 118, an input value from the user. In block 318, routine 300 compares, by the account application 118, the input value to a copy of the OTP received from the OTP generator 142. In block 320, routine 300 determines, by the account application 118, that the comparison results in a match. In block 322, routine 300 displays, by the account application 118 based on the decryption result 148 and the determination that the comparison results in the match, one or more attributes of the account on the device. Additionally and/or alternatively, the account application 118 may authorize performance of an operation requested by the user based on the determination that the comparison results in a match and the decryption result 148.

Figure 4:
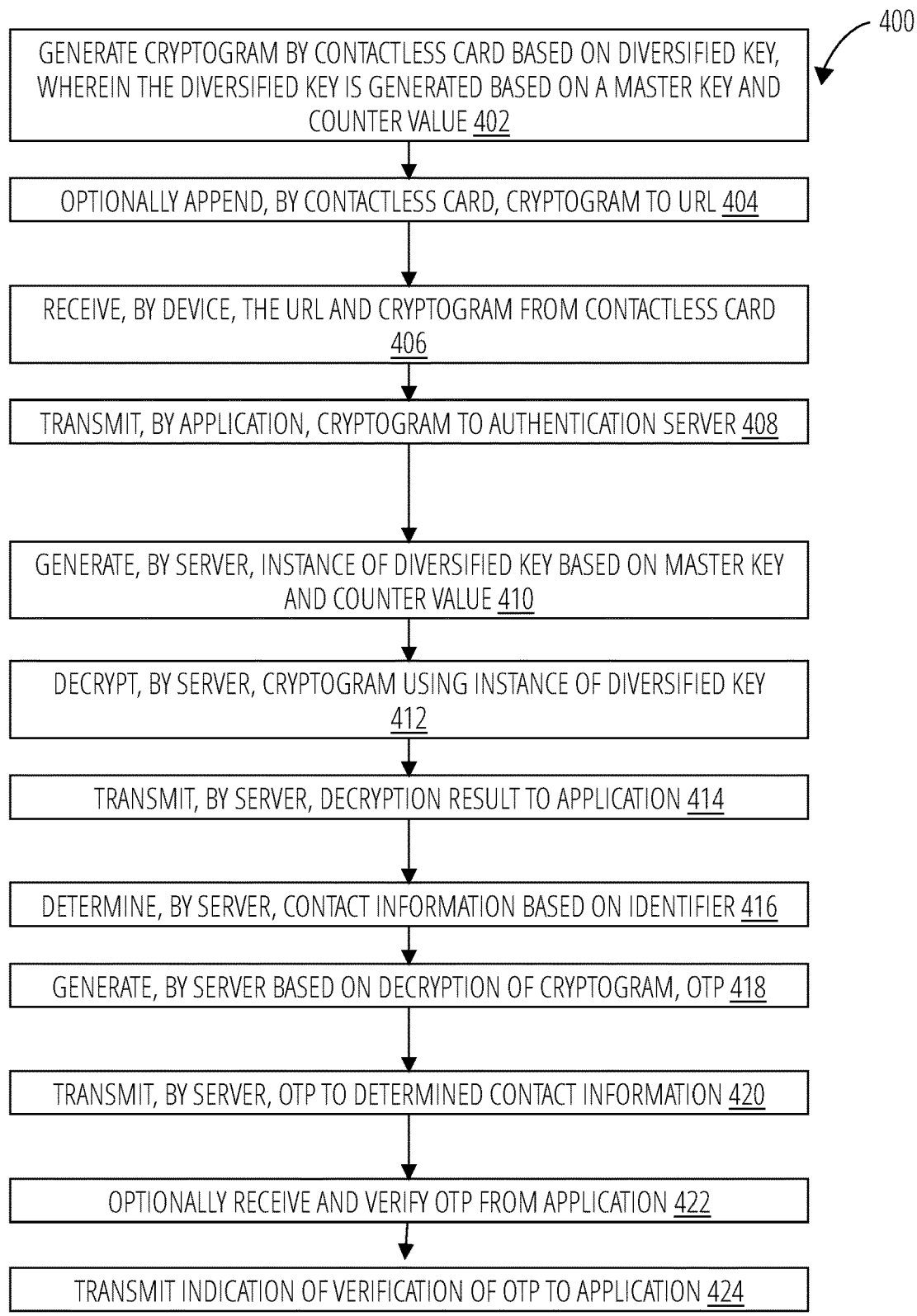
FIG. 4 illustrates a routine 400 in accordance with one embodiment.

FIG. 4 illustrates an embodiment of a logic flow, or routine, 400. The logic flow 400 may be representative of some or all of the operations executed by one or more embodiments described herein. For example, the logic flow 400 may include some or all of the operations to enable secure generation of an OTP using a contactless card. Embodiments are not limited in this context.

In block 402, routine 400 receives, by an operating system 138 executing on a processor of a computing device 102, a uniform resource locator (URL) 120 and a cryptogram 134 from a contactless card 136 associated with an account. The applet 108 may generate the cryptogram 134 as described in greater detail herein. The applet 108 may further transmit an unencrypted identifier, e.g., customer ID 116 to the computing device 102. In block 404, routine 400 launches, by the operating system 138 responsive to receiving the URL 120, an account application 118 associated with the contactless card 136. In block 406, routine 400 transmits, by the account application 118, the cryptogram 134 to an authentication server 104. The account application 118 may further transmit the unencrypted identifier to the server 104.

In block 408, routine 400 receives, by the account application 118, a decryption result 148 from the authentication server 104 indicating the authentication server 104 decrypted the cryptogram 134. In block 410, routine 400 transmits, by the account application 118 based on the decryption result 148, a request for a one-time passcode (OTP) comprising an identifier to the URL. The identifier may be the unencrypted customer ID 116, the device identifier, and/or an identifier of the contactless card 136. In block 412, routine 400 determines, by the server 104 based on the identifier, contact information in an account database 130. The contact information may include, but is not limited to, a phone number, email address, device identifier, etc. In block 414, routine 400 receives, by the computing device 102 at the determined contact information, the OTP 150 from an OTP generator 142 at the URL 120. In block 416, routine 400 receives, by the account application 118, an input value. In block 418, routine 400 compares, by the account application 118, the input value to a copy of the OTP 150 received from the OTP generator 142. In block 420, routine 400 determines, by the application, that the comparison results in a match. In block 422, routine 400 displays, by the account application 118 based on the determination that the comparison results in the match and based on the decryption result 148, one or more attributes of the account on the device.

Figure 5A:
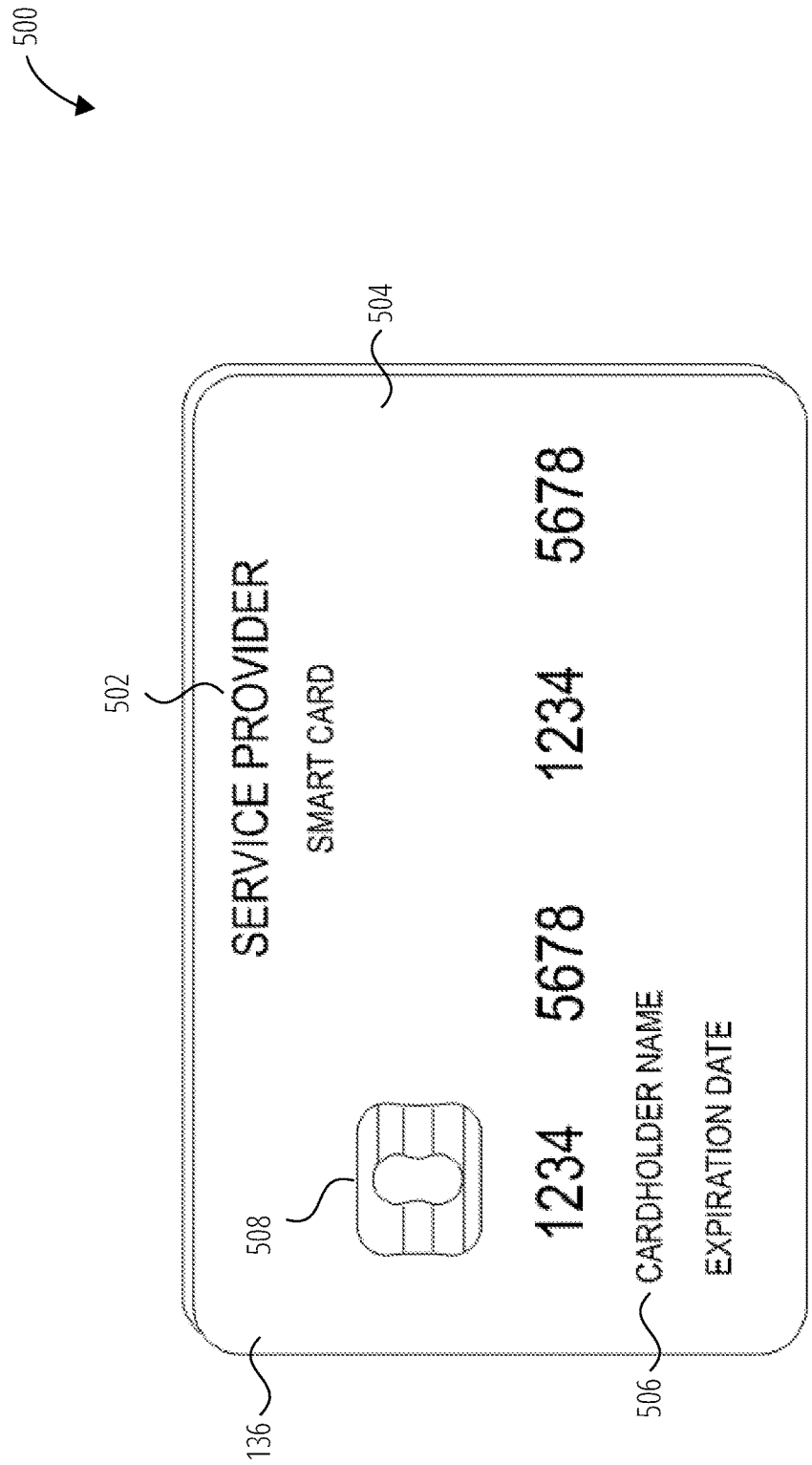
FIG. 5A illustrates a contactless card in accordance with one embodiment.

FIG. 5A is a schematic 500 illustrating an example configuration of a contactless card 136, which may include a payment card, such as a credit card, debit card, or gift card, issued by a service provider as displayed as service provider indicia 502 on the front or back of the contactless card 136. In some examples, the contactless card 136 is not related to a payment card, and may include, without limitation, an identification card. In some examples, the transaction card may include a dual interface contactless payment card, a rewards card, and so forth. The contactless card 136 may include a substrate 504, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 136 may have physical characteristics compliant with the ID-1 format of the ISO/IEC 7816 standard, and the transaction card may otherwise be compliant with the ISO/IEC 14443 standard. However, it is understood that the contactless card 136 according to the present disclosure may have different characteristics, and the present disclosure does not require a transaction card to be implemented in a payment card.

Figure 5B:
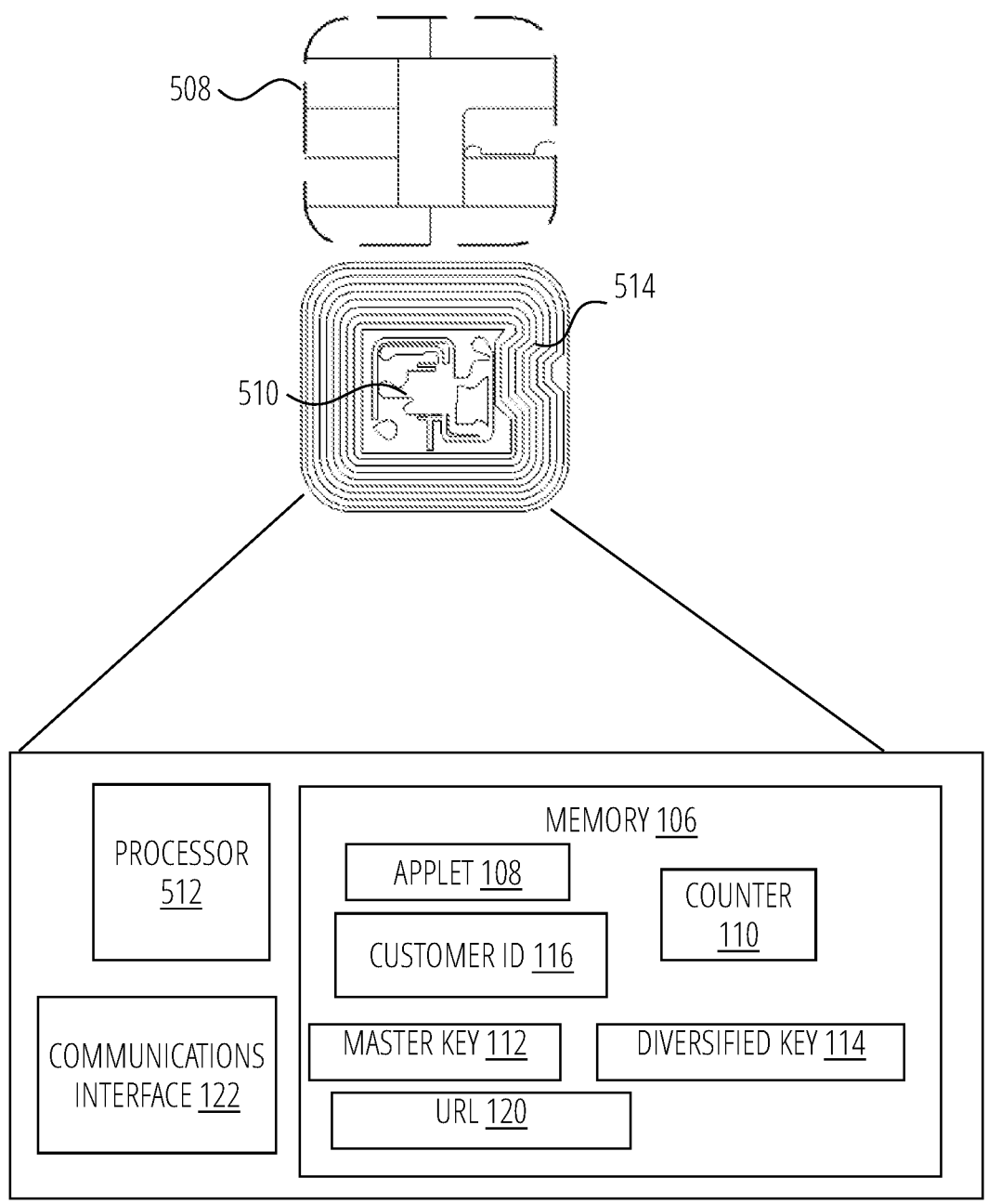
FIG. 5B illustrates a contactless card 136 in accordance with one embodiment.

The contactless card 136 may also include identification information 506 displayed on the front and/or back of the card, and a contact pad 508. The contact pad 508 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 136 may also include processing circuitry, antenna and other components as will be further discussed in FIG. 5B. These components may be located behind the contact pad 508 or elsewhere on the substrate 504, e.g. within a different layer of the substrate 504, and may electrically and physically coupled with the contact pad 508. The contactless card 136 may also include a magnetic strip or tape, which may be located on the back of the card (not shown in FIG. 5A). The contactless card 136 may also include a Near-Field Communication (NFC) device coupled with an antenna capable of communicating via the NFC protocol. Embodiments are not limited in this manner.

As illustrated in FIG. 2, the contact pad 508 of contactless card 136 may include processing circuitry 510 for storing, processing, and communicating information, including a processor 512, a memory 106, and one or more communications interface 122. It is understood that the processing circuitry 510 may contain additional components, including processors, memories, error and parity/CRC checkers, data encoders, anticollision algorithms, controllers, command decoders, security primitives and tamperproofing hardware, as necessary to perform the functions described herein.

The memory 106 may be a read-only memory, write-once read-multiple memory or read/write memory, e.g., RAM, ROM, and EEPROM, and the contactless card 136 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 106 may be encrypted memory utilizing an encryption algorithm executed by the processor 512 to encrypted data.

The memory 106 may be configured to store one or more applets 108, one or more counters 110, a customer ID 116, the master key 112, diversified key 114, and URLs 120. The one or more applets 108 may comprise one or more software applications configured to execute on one or more contactless cards, such as a Java® Card applet. However, it is understood that applet 108 are not limited to Java Card applets, and instead may be any software application operable on contactless cards or other devices having limited memory. The one or more counter 110 may comprise a numeric counter sufficient to store an integer. The customer ID 116 may comprise a unique alphanumeric identifier assigned to a user of the contactless card 136, and the identifier may distinguish the user of the contactless card from other contactless card users. In some examples, the customer ID 116 may identify both a customer and an account assigned to that customer and may further identify the contactless card 136 associated with the customer's account.

The processor 512 and memory elements of the foregoing exemplary embodiments are described with reference to the contact pad 508, but the present disclosure is not limited thereto. It is understood that these elements may be implemented outside of the contact pad 508 or entirely separate from it, or as further elements in addition to processor 512 and memory 106 elements located within the contact pad 508.

In some examples, the contactless card 136 may comprise one or more antenna(s) 514. The one or more antenna(s) 514 may be placed within the contactless card 136 and around the processing circuitry 510 of the contact pad 508. For example, the one or more antenna(s) 514 may be integral with the processing circuitry 510 and the one or more antenna(s) 514 may be used with an external booster coil. As another example, the one or more antenna(s) 514 may be external to the contact pad 508 and the processing circuitry 510.

In an embodiment, the coil of contactless card 136 may act as the secondary of an air core transformer. The terminal may communicate with the contactless card 136 by cutting power or amplitude modulation. The contactless card 136 may infer the data transmitted from the terminal using the gaps in the power connection of the contactless card 136, which may be functionally maintained through one or more capacitors. The contactless card 136 may communicate back by switching a load on the coil of the contactless card 136 or load modulation. Load modulation may be detected in the terminal's coil through interference. More generally, using the antenna(s) 514, processor 512, and/or the memory 106, the contactless card 136 provides a communications interface to communicate via NFC, Bluetooth, and/or Wi-Fi communications.

As explained above, contactless card 136 may be built on a software platform operable on smart cards or other devices having limited memory, such as JavaCard, and one or more or more applications or applets may be securely executed.

Applet 108 may be added to contactless cards to provide a one-time password (OTP) for multifactor authentication (MFA) in various mobile application-based use cases. Applet 108 may be configured to respond to one or more requests, such as near field data exchange requests, from a reader, such as a mobile NFC reader (e.g., of a mobile computing device 102 or point-of-sale terminal), and produce an NDEF message that comprises a cryptographically secure OTP encoded as an NDEF text tag. The NDEF message may include the URL 120, the cryptogram 134, and any other data.

One example of an NDEF OTP is an NDEF short-record layout (SR=1). In such an example, one or more applets 108 may be configured to encode the OTP as an NDEF type 4 well known type text tag. In some examples, NDEF messages may comprise one or more records. The applet 108 may be configured to add one or more static tag records in addition to the OTP record.

In some examples, the one or more applets 108 may be configured to emulate an RFID tag. The RFID tag may include one or more polymorphic tags. In some examples, each time the tag is read, different cryptographic data is presented that may indicate the authenticity of the contactless card. Based on the one or more applets 108, an NFC read of the tag may be processed, the data may be transmitted to a server, such as a server of a banking system, and the data may be validated at the server.

In some examples, the contactless card 136 and server may include certain data such that the card may be properly identified. The contactless card 136 may include one or more unique identifiers (not pictured). Each time a read operation takes place, the counter 110 may be configured to increment. In some examples, each time data from the contactless card 136 is read (e.g., by a mobile device), the counter 110 is transmitted to the server for validation and determines whether the counter 110 are equal (as part of the validation) to a counter of the server.

The one or more counter 110 may be configured to prevent a replay attack. For example, if a cryptogram has been obtained and replayed, that cryptogram is immediately rejected if the counter 110 has been read or used or otherwise passed over. If the counter 110 has not been used, it may be replayed. In some examples, the counter that is incremented on the contactless card 136 is different from the counter that is incremented for transactions. The contactless card 136 is unable to determine the application transaction counter 110 since there is no communication between applets 108 on the contactless card 136. In some examples, the contactless card 136 may comprise a first applet 440-1, which may be a transaction applet, and a second applet 440-2. Each applet 440-1 and 440-2 may comprise a respective counter 110.

In some examples, the counter 110 may get out of sync. In some examples, to account for accidental reads that initiate transactions, such as reading at an angle, the counter 110 may increment but the application does not process the counter 110. In some examples, when the mobile device 10 is woken up, NFC may be enabled and the device 102 may be configured to read available tags, but no action is taken responsive to the reads.

To keep the counter 110 in sync, an application, such as a background application, may be executed that would be configured to detect when the mobile device 102 wakes up and synchronize with the server of a banking system indicating that a read that occurred due to detection to then move the counter 110 forward. In other examples, Hashed One Time Password may be utilized such that a window of mis-synchronization may be accepted. For example, if within a threshold of 10, the counter 110 may be configured to move forward. But if within a different threshold number, for example within 10 or 1000, a request for performing re-synchronization may be processed which requests via one or more applications that the user tap, gesture, or otherwise indicate one or more times via the user's device. If the counter 110 increases in the appropriate sequence, then it possible to know that the user has done so.

The key diversification technique described herein with reference to the counter 110, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 136, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 136. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 136 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 6:
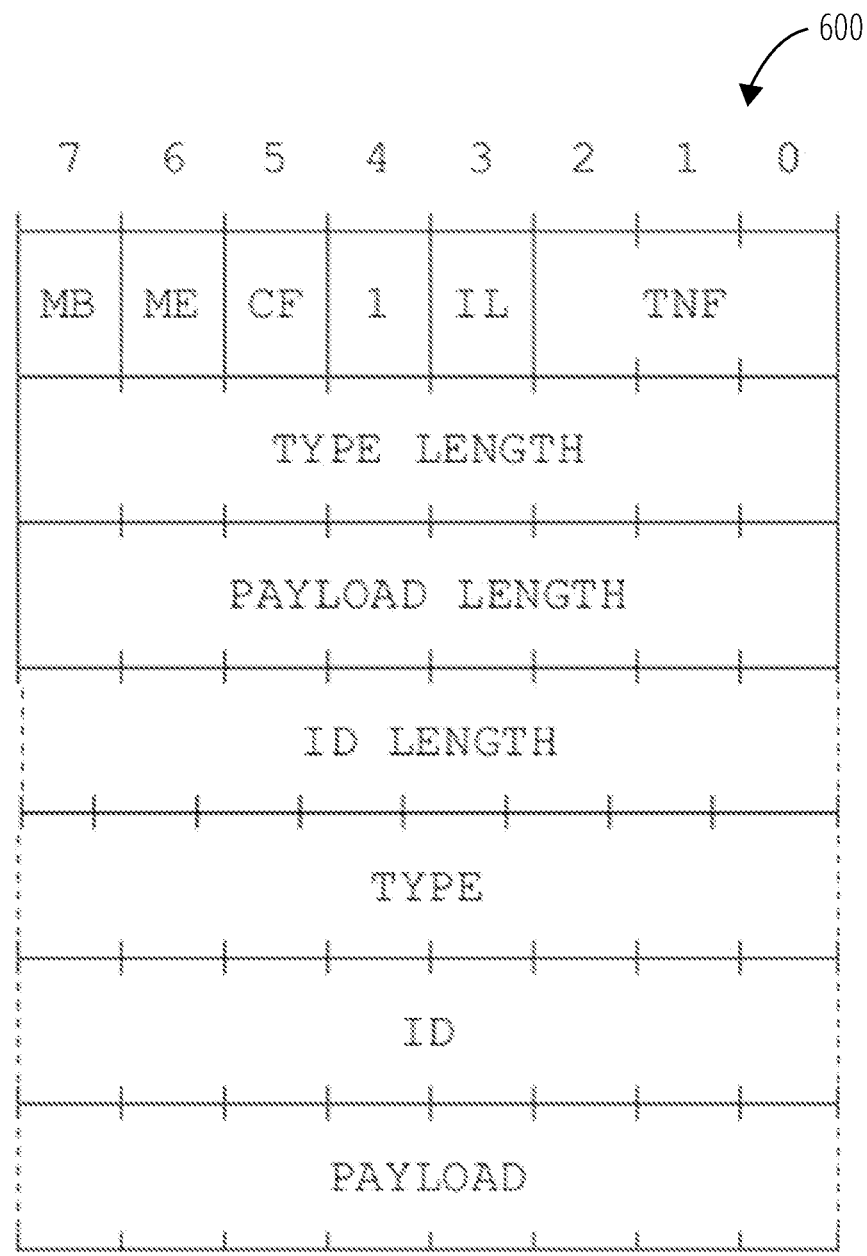
FIG. 6 illustrates a data structure 600 in accordance with one embodiment.

FIG. 6 illustrates an NDEF short-record layout (SR=1) data structure 600 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. The data structure 600 may include the URL 120, the cryptogram 134, and any other data provided by the applet 108.

Figure 7:
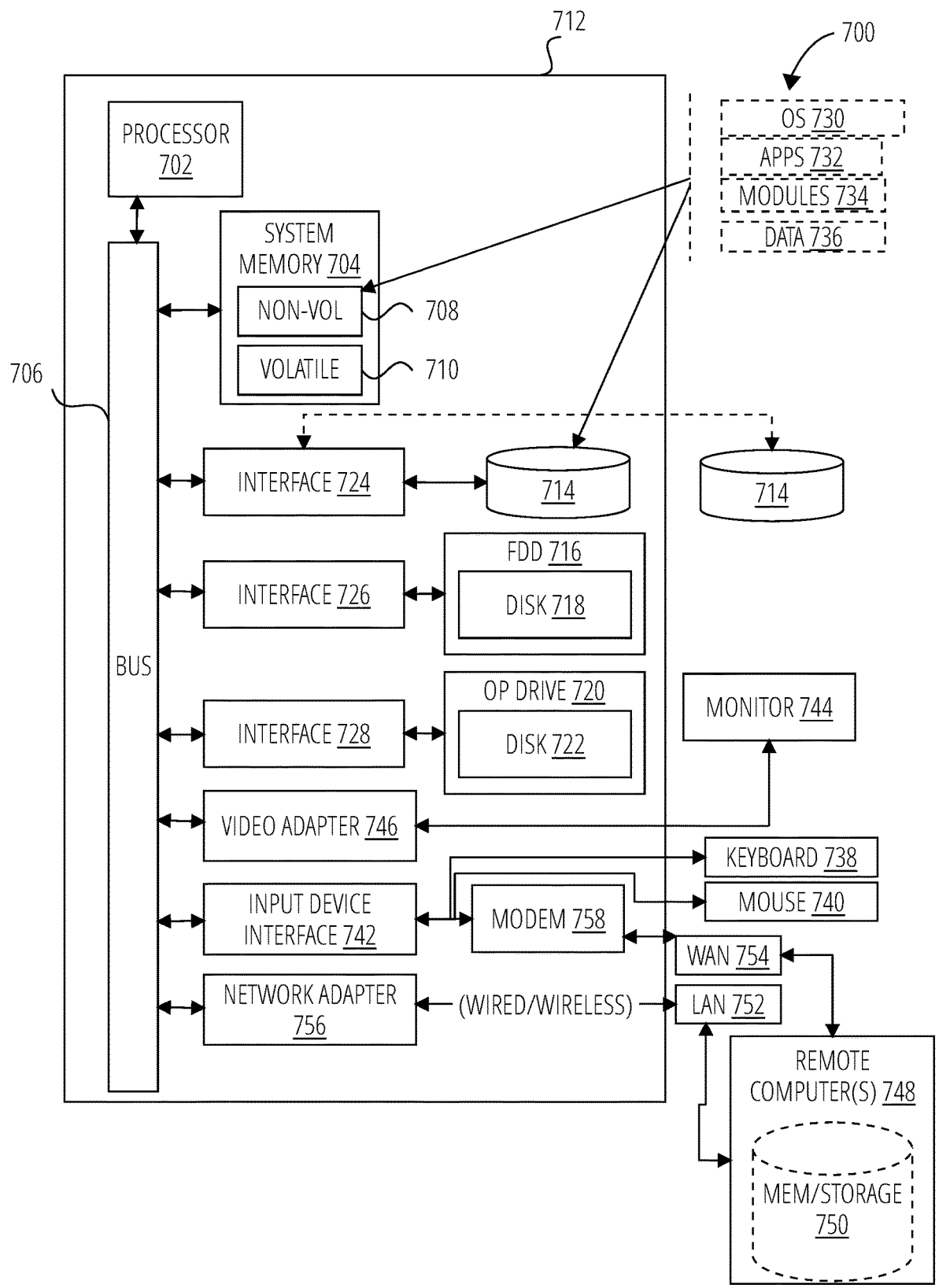
FIG. 7 illustrates a computer architecture 700 in accordance with one embodiment.

FIG. 7 illustrates an embodiment of an exemplary computer architecture 700 suitable for implementing various embodiments as previously described. In one embodiment, the computer architecture 700 may include or be implemented as part of computing architecture 100.

As used in this application, the terms "system" and "component" are intended to refer to a computer-related entity, either hardware, a combination of hardware and software, software, or software in execution, examples of which are provided by the exemplary computing computer architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 100.

As shown in FIG. 7, the computer architecture 700 includes a processor 702, a system memory 704 and a system bus 706. The processor 702 can be any of various commercially available processors.

The system bus 706 provides an interface for system components including, but not limited to, the system memory 704 to the processor 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile 708 and/or volatile 710. A basic input/output system (BIOS) can be stored in the non-volatile 708.

The computer 712 may include various types of computer-readable storage media in the form of one or more lower speed memory units, including an internal (or external) hard disk drive 714, a magnetic disk drive 716 to read from or write to a removable magnetic disk 718, and an optical disk drive 720 to read from or write to a removable optical disk 722 (e.g., a CD-ROM or DVD). The hard disk drive 714, magnetic disk drive 716 and optical disk drive 720 can be connected to system bus 706 the by an HDD interface 724, and FDD interface 726 and an optical disk drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 708, and volatile 710, including an operating system 730, one or more applications 732, other program modules 734, and program data 736. In one embodiment, the one or more applications 732, other program modules 734, and program data 736 can include, for example, the various applications and/or components of the system 100.

A user can enter commands and information into the computer 712 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 702 through an input device interface 742 that is coupled to the system bus 706 but can be connected by other interfaces such as a parallel port, IEEE 1394 serial port, a game port, a USB port, an IR interface, and so forth.

A monitor 744 or other type of display device is also connected to the system bus 706 via an interface, such as a video adapter 746. The monitor 744 may be internal or external to the computer 712. In addition to the monitor 744, a computer typically includes other peripheral output devices, such as speakers, printers, and so forth.

The computer 712 may operate in a networked environment using logical connections via wire and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all the elements described relative to the computer 712, although, for purposes of brevity, only a memory and/or storage device 750 is illustrated. The logical connections depicted include wire/wireless connectivity to a local area network 752 and/or larger networks, for example, a wide area network 754. Such LAN and WAN networking environments are commonplace in offices and companies, and facilitate enterprise-wide computer networks, such as intranets, all of which may connect to a global communications network, for example, the Internet.

When used in a local area network 752 networking environment, the computer 712 is connected to the local area network 752 through a wire and/or wireless communication network interface or network adapter 756. The network adapter 756 can facilitate wire and/or wireless communications to the local area network 752, which may also include a wireless access point disposed thereon for communicating with the wireless functionality of the network adapter 756.

When used in a wide area network 754 networking environment, the computer 712 can include a modem 758, or is connected to a communications server on the wide area network 754 or has other means for establishing communications over the wide area network 754, such as by way of the Internet. The modem 758, which can be internal or external and a wire and/or wireless device, connects to the system bus 706 via the input device interface 742. In a networked environment, program modules depicted relative to the computer 712, or portions thereof, can be stored in the remote memory and/or storage device 750. It will be appreciated that the network connections shown are exemplary and other means of establishing a communications link between the computers can be used.

The computer 712 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1A-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
  receiving, by a server, a request from an application executing on a device, the request comprising a uniform resource locator (URL) and a cryptogram, the cryptogram generated by a contactless card associated with an account;
  decrypting, by the server, the cryptogram;
  transmitting, by the server to the application, a decryption result indicating the server decrypted the cryptogram;
  receiving, by the server from the application based on the decryption result, a request for a one-time passcode (OTP);
  transmitting, by the server, the OTP to the application;
  receiving, by the server from the application, an input value;
  determining, by the server, the input value matches the OTP; and
  transmitting, by the server to the application based on the input value matching the OTP, a result indicating the match to authorize performance of a requested operation associated with the account on the device.

2. The method of claim 1, wherein the server generates the OTP or receives the OTP from an OTP generator prior to transmitting the OTP to the application.

3. The method of claim 1, wherein the requested operation comprises one or more of: (i) viewing one or more attributes of the account, (ii) transferring funds from the account, (iii) receiving funds, or (iv) processing a purchase using funds from the account.

4. The method of claim 3, wherein the request for the OTP comprises a request to perform the operation.

5. The method of claim 1, wherein the URL is directed to an application programming interface (API) endpoint of the server.

6. The method of claim 1, wherein the request for the OTP comprises an identifier, wherein the identifier comprises one of an identifier of the contactless card or an identifier of the account.

7. The method of claim 6, wherein the server transmits the OTP based on one of: (i) an email address associated with the identifier, (ii) a short message service (SMS) message at a phone number associated with the identifier, or (iii) a push notification based on a device identifier of the device associated with the identifier.

8. A non-transitory computer-readable storage medium, the computer-readable storage medium including instructions that when executed by a processor, cause the processor to:
  receive a request from an application executing on a device, the request comprising a uniform resource locator (URL) and a cryptogram, the cryptogram generated by a contactless card associated with an account;
  decrypt the cryptogram;
  transmit, to the application, a decryption result indicating the cryptogram was decrypted;
  receive, from the application based on the decryption result, a request for a one-time passcode (OTP);
  transmit the OTP to the application;
  receive, from the application, an input value;
  determine the input value matches the OTP; and
  transmit, to the application based on the input value matching the OTP, a result indicating the match to authorize performance of a requested operation associated with the account on the device.

9. The computer-readable storage medium of claim 8, wherein the processor generates the OTP or receives the OTP from an OTP generator prior to transmitting the OTP to the application.

10. The computer-readable storage medium of claim 8, wherein the requested operation comprises one or more of: (i) view one or more attributes of the account, (ii) transferring funds from the account, (iii) receiving funds, or (iv) processing a purchase using funds from the account.

11. The computer-readable storage medium of claim 10, wherein the request for the OTP comprises a request to perform the operation.

12. The computer-readable storage medium of claim 8, wherein the URL is directed to an application program interface (API) endpoint.

13. The computer-readable storage medium of claim 8, wherein the request for the OTP comprises an identifier, wherein the identifier comprises one of an identifier of the contactless card or an identifier of the account.

14. The computer-readable storage medium of claim 13, wherein the OTP is transmitted based on one of: (i) an email address associated with the identifier, (ii) a short message service (SMS) message at a phone number associated with the identifier, or (iii) a push notification based on a device identifier of the device associated with the identifier.

15. A computing apparatus comprising:
  a processor; and
  a memory storing instructions that, when executed by the processor, cause the processor to:
    receive a request from an application executing on a device, the request comprising a uniform resource locator (URL) and a cryptogram, the cryptogram generated by a contactless card associated with an account;
    decrypt the cryptogram;
    transmit, to the application, a decryption result indicating the cryptogram was decrypted;
    receive, from the application based on the decryption result, a request for a one-time passcode (OTP);
    transmit the OTP to the application;
    receive, from the application, an input value;
    determine the input value matches the OTP; and
    transmit, to the application based on the input value matching the OTP, a result indicating the match to authorize performance of a requested operation associated with the account on the device.

16. The computing apparatus of claim 15, wherein the processor generates the OTP or receives the OTP from an OTP generator prior to transmitting the OTP to the application.

17. The computing apparatus of claim 15, wherein the requested operation comprises one or more of: (i) view one or more attributes of the account, (ii) transferring funds from the account, (iii) receiving funds, or (iv) processing a purchase using funds from the account.

18. The computing apparatus of claim 17, wherein the request for the OTP comprises a request to perform the operation.

19. The computing apparatus of claim 15, wherein the URL is directed to an application program interface (API) endpoint.

20. The computing apparatus of claim 15, wherein the request for the OTP comprises an identifier, wherein the identifier comprises one of an identifier of the contactless card or an identifier of the account, wherein the OTP is transmitted based on one of: (i) an email address associated with the identifier, (ii) a short message service (SMS) message at a phone number associated with the identifier, or (iii) a push notification based on a device identifier of the device associated with the identifier.

* * * * *